United States Patent
Gupta et al.

(10) Patent No.: US 12,136,065 B2
(45) Date of Patent: Nov. 5, 2024

(54) METHODS AND SYSTEMS FOR MAKING FILE REQUESTS IN A COLLABORATION ENVIRONMENT

(71) Applicant: Box, Inc., Redwood City, CA (US)

(72) Inventors: Virender Gupta, Morganville, NJ (US); Ravneet Uberoi, San Francisco, CA (US)

(73) Assignee: Box, Inc., Redwood City, CA (US)

(*) Notice: Subject to any disclaimer, the term of this patent is extended or adjusted under 35 U.S.C. 154(b) by 534 days.

(21) Appl. No.: 17/162,282

(22) Filed: Jan. 29, 2021

(65) Prior Publication Data

US 2022/0036312 A1 Feb. 3, 2022

Related U.S. Application Data

(63) Continuation-in-part of application No. 16/944,529, filed on Jul. 31, 2020, now Pat. No. 11,836,196.

(51) Int. Cl.
| | |
|---|---|
| *G06F 16/00* | (2019.01) |
| *G06F 16/907* | (2019.01) |
| *G06F 21/62* | (2013.01) |
| *G06Q 10/101* | (2023.01) |

(52) U.S. Cl.
CPC ......... *G06Q 10/101* (2013.01); *G06F 16/907* (2019.01); *G06F 21/6254* (2013.01)

(58) Field of Classification Search
CPC .......................... G06Q 10/101; G06F 21/6254
See application file for complete search history.

(56) References Cited

U.S. PATENT DOCUMENTS

| | | | |
|---|---|---|---|
| 8,666,961 B1 | 3/2014 | Qureshi et al. | |
| 2010/0174974 A1* | 7/2010 | Brisebois | G06Q 10/00 715/780 |
| 2013/0318593 A1* | 11/2013 | Smith | G06F 16/907 709/225 |
| 2014/0067990 A1 | 3/2014 | Abdelhameed et al. | |
| 2016/0364106 A1* | 12/2016 | Koum | H04L 67/306 |
| 2017/0063720 A1 | 3/2017 | Foskett et al. | |

(Continued)

OTHER PUBLICATIONS

Inselvini, Alberto. "Spam Prevention Using zk-SNARKs for Anonymous Peer-to-Peer Content Sharing Systems." arXiv preprint arXiv:2103.02061 (2021).*

(Continued)

*Primary Examiner* — Nan Hutton
(74) *Attorney, Agent, or Firm* — Sheridan Ross P.C.

(57) ABSTRACT

Embodiments of the disclosure provide systems and methods for obtaining content for a workspace of a collaboration environment. According to one embodiment, requesting and obtaining one or more content items for a workspace of a collaboration environment can comprise generating a content request identifying the one or more content items and metadata for the one or more content items requested from a submitter. The content request can be provided to a computing device associated with the submitter. A determination can be made as to whether the content item can be submitted anonymously. In response to determining the content items may be submitted anonymously, the content items and the metadata can be obtained while maintaining the anonymity of the submitter.

20 Claims, 10 Drawing Sheets

(56) References Cited

U.S. PATENT DOCUMENTS

2020/0012965 A1\* 1/2020 Silansky ................ G06N 20/00

OTHER PUBLICATIONS

Ishikawa, Naoki, et al. "Detection of users suspected of using multiple user accounts and manipulating evaluations in a community site." Proceedings of the 6th International Conference on Natural Language Processing and Knowledge Engineering (NLPKE—2010). IEEE, 2010.\*
Official Action for U.S. Appl. No. 16/944,529, dated Aug. 23, 2022 12 pages.
Official Action for U.S. Appl. No. 16/944,529, dated Feb. 17, 2023 13 pages.
Official Action for U.S. Appl. No. 16/944,529, dated Jul. 28, 2023 11 pages.

\* cited by examiner

METHODS AND SYSTEMS FOR MAKING FILE REQUESTS IN A COLLABORATION ENVIRONMENT

CROSS REFERENCE TO RELATED APPLICATIONS

The present application is a continuation-in-part of U.S. patent application Ser. No. 16/7944,529 filed on Jul. 31, 2020, by Gupta et al., and entitled "Methods and Systems for Making File Requests in a Collaboration Environment," the entire disclosure of which is incorporated herein by reference, in its entirety, for all that it teaches and for all purposes.

FIELD OF THE DISCLOSURE

Embodiments of the present disclosure relate generally to methods and systems for online sharing of information and more particularly to requesting and obtaining content items in a workspace of a cloud-based collaboration environment.

BACKGROUND

A cloud-based collaboration environment maintains a store of information shared between users and makes that information available to those users online through a virtual workspace. In this workspace, users can create, view, and edit the files and other information in the store. Files can be added or uploaded to the workspace by the users, sometimes in response to a request from another user. The files in the workspace typically have associated metadata which is used within the collaboration environment to perform a variety of tasks such as searching for content, tracking content, organizing content, etc. This metadata is initially assigned when the file is created or uploaded. However, current collaboration environments limit the metadata collected to certain predefined metadata or system metadata. Current collaboration environments do not allow a user requesting content for the workspace to specify what metadata is to be collected for that content and does not allow the user providing that context to provide values to be assigned to that metadata. This approach limits the functionality and flexibility of these collaboration environments. Hence, there is a need for improved methods and systems for requesting and obtaining a content item for a workspace of a collaboration environment.

BRIEF SUMMARY

Embodiments of the disclosure provide systems and methods for obtaining content for a workspace of a collaboration environment. According to one embodiment, a method for requesting and obtaining one or more content items for a workspace of a collaboration environment can comprise generating, by a cloud-based collaboration environment system, a content request identifying the one or more content items and metadata for the one or more content items requested from a submitter. The generated content request can be provided by the cloud-based collaboration environment system to a computing device associated with the submitter.

In some cases, generating the content request can comprise generating a link to a saved form definition and in some cases, the link can initiate an authorization process. Providing the generated content request to the computing device associated with the submitter can comprise providing the generated link to the saved form definition. In some cases, generating the content request identifying the one or more content items and metadata for the one or more content items requested from the submitter can comprise copying a previously generated form defining a previous content request. Additionally, or alternatively, generating the content request identifying the one or more content items and metadata for the one or more content items requested from the submitter can comprise copying a form defining a template content request.

A determination can be made as to whether the one or more content items may be submitted anonymously. In response to determining the one or more content items may be submitted anonymously, the one or more content items and the requested metadata for the one or more content items can be obtained by the cloud-based collaboration environment system from the computing device associated with the submitter in response to the provided request while maintaining the anonymity of the submitter. In response to determining the one or more content items may not be submitted anonymously, an authorization process with the computing device of the submitter can be initiated by the cloud-based collaboration environment system. A determination can then be made by the cloud-based collaboration environment system as to whether the authorization process has been completed successfully. In response to determining the authorization process has completed successfully, the one or more content items and the requested metadata for the one or more content items can be obtained by the cloud-based collaboration environment system from the computing device associated with the submitter in response to the provided request.

Once the one or more content items and the requested metadata for the one or more content items has been obtained by the cloud-based collaboration environment system, a workflow can be initiated by the cloud-based collaboration environment system based on the obtained one or more content items or the obtained metadata for the obtained content item. In some cases, the obtained one or more content items can comprise a plurality of content items. In such cases, the workflow can be applied to the plurality of content items as a whole package.

According to another embodiment, a cloud-based collaboration environment system can comprise a processor and a memory coupled with and readable by the processor. The memory can store therein a set of instructions which, when executed by the processor, causes the processor to request and obtain one or more content items for a collaboration environment by generating a content request identifying the one or more content items and metadata for the one or more content items requested from a submitter. The instructions can further cause the processor to provide the generated content request to a computing device associated with the submitter.

In some cases, generating the content request can comprise generating a link to a saved form definition and in some cases the link can initiate an authorization process. Providing the generated content request to the computing device associated with the submitter can comprise providing the generated link to the saved form definition. In some cases, generating the content request identifying the one or more content items and metadata for the one or more content items requested from the submitter can comprise copying a previously generated form defining a previous content request. Additionally, or alternatively, generating the content request identifying the one or more content items and metadata for the one or more content items requested from the submitter can comprise copying a form defining a template content request.

A determination can be made as to whether the one or more content items may be submitted anonymously. In response to determining the one or more content items may be submitted anonymously, the instructions can further cause the processor to obtain the one or more content items and the requested metadata for the one or more content items from the computing device associated with the submitter in response to the provided request while maintaining the anonymity of the submitter. In response to determining the one or more content items may not be submitted anonymously, the instructions can further cause the processor to initiate an authorization process with the computing device of the submitter and make a determination as to whether the authorization process has been completed successfully. In response to determining the authorization process has completed successfully, the instructions can cause the processor to obtain the one or more content items and the requested metadata for the one or more content items from the computing device associated with the submitter in response to the provided request.

Once the one or more content items and the requested metadata for the one or more content items has been obtained by the cloud-based collaboration environment system, the instructions can further cause the processor to initiate a workflow based on the obtained one or more content items or the obtained metadata for the obtained content item. In some cases, the obtained one or more content items can comprise a plurality of content items. In such cases, the workflow can be applied to the plurality of content items as a whole package.

According to yet another embodiment, a non-transitory, computer-readable medium can comprise a set of instructions stored therein which, when executed by a processor, causes the processor to request and obtain content for a collaboration environment by generating a content request identifying the one or more content items and metadata for the one or more content items requested from a submitter. The instructions can further cause the processor to provide the generated content request to a computing device associated with the submitter.

In some cases, generating the content request can comprise generating a link to a saved form definition and in some cases the link can initiate an authorization process. Providing the generated content request to the computing device associated with the submitter can comprise providing the generated link to the saved form definition. In some cases, generating the content request identifying the one or more content items and metadata for the one or more content items requested from the submitter can comprise copying a previously generated form defining a previous content request. Additionally, or alternatively, generating the content request identifying the one or more content items and metadata for the one or more content items requested from the submitter can comprise copying a form defining a template content request.

A determination can be made as to whether the one or more content items may be submitted anonymously. In response to determining the one or more content items may be submitted anonymously, the instructions can further cause the processor to obtain the one or more content items and the requested metadata for the one or more content items from the computing device associated with the submitter in response to the provided request while maintaining the anonymity of the submitter. In response to determining the one or more content items may not be submitted anonymously, the instructions can further cause the processor to initiate an authorization process with the computing device of the submitter and make a determination as to whether the authorization process has been completed successfully. In response to determining the authorization process has completed successfully, the instructions can cause the processor to obtain the one or more content items and the requested metadata for the one or more content items from the computing device associated with the submitter in response to the provided request.

Once the one or more content items and the requested metadata for the one or more content items has been obtained by the cloud-based collaboration environment system, the instructions can further cause the processor to initiate a workflow based on the obtained one or more content items or the obtained metadata for the obtained content item. In some cases, the obtained one or more content items can comprise a plurality of content items. In such cases, the workflow can be applied to the plurality of content items as a whole package.

Figure 1:
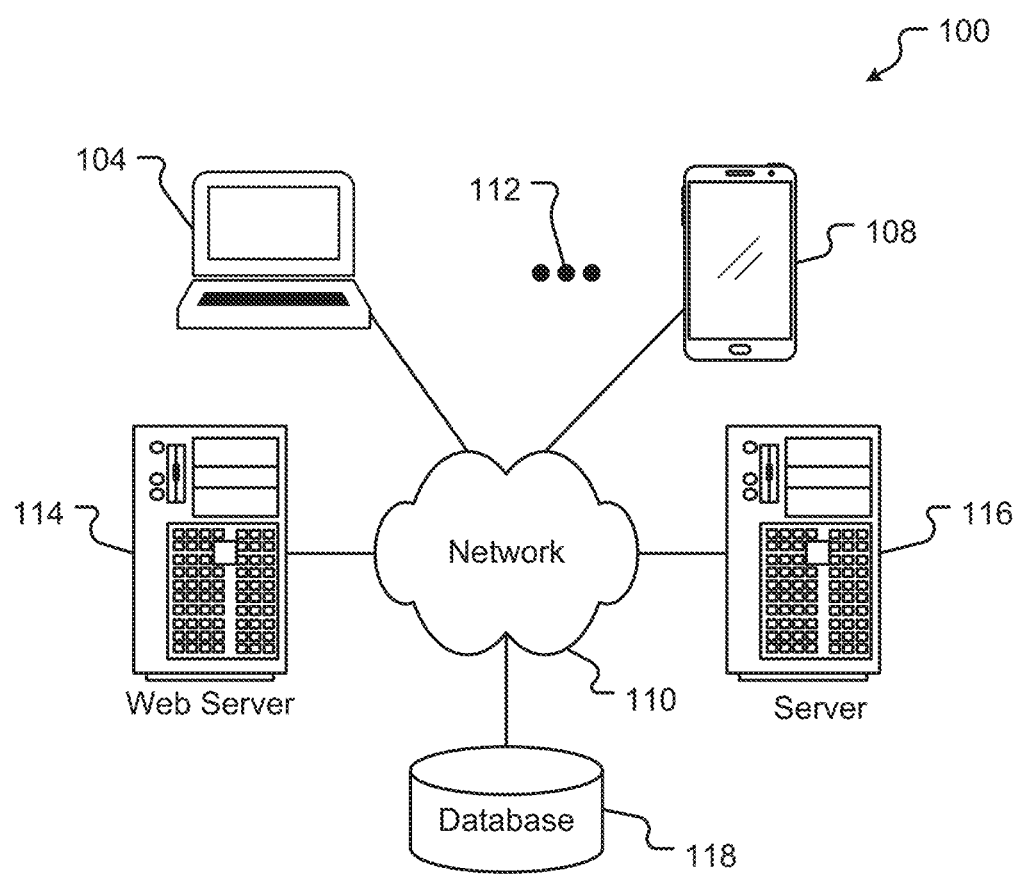
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internet-work Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
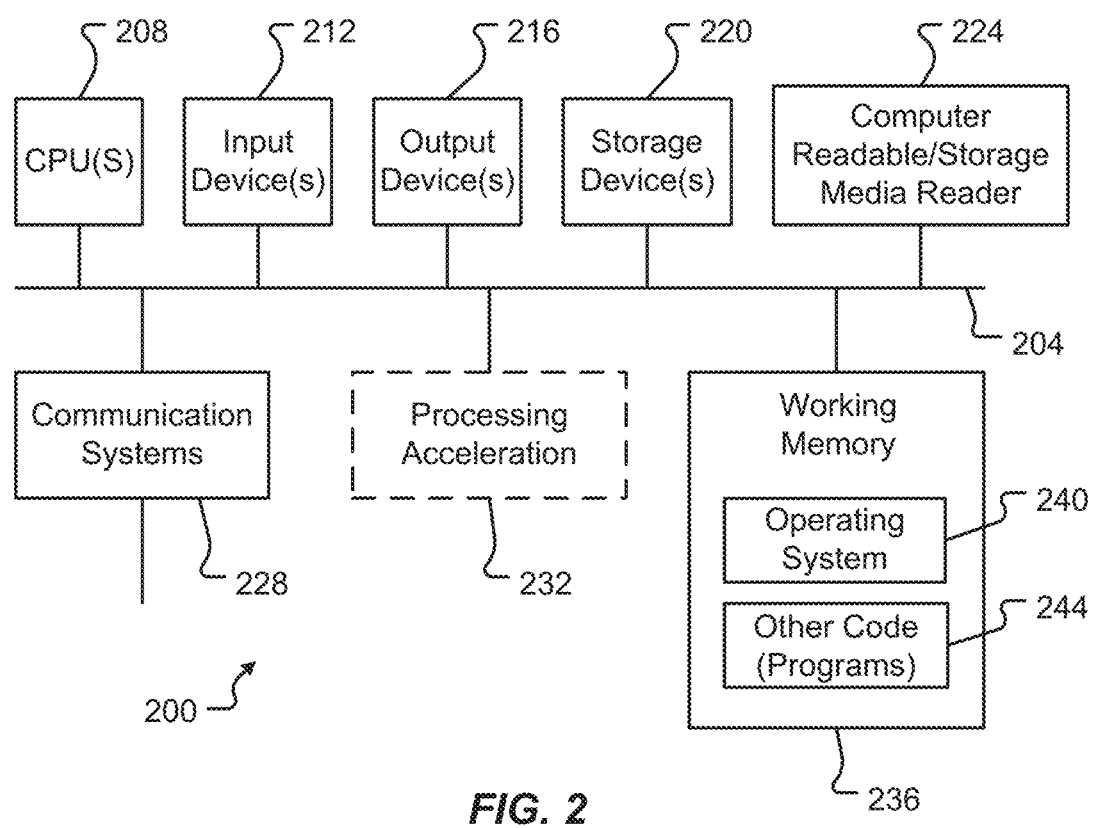
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm®

Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
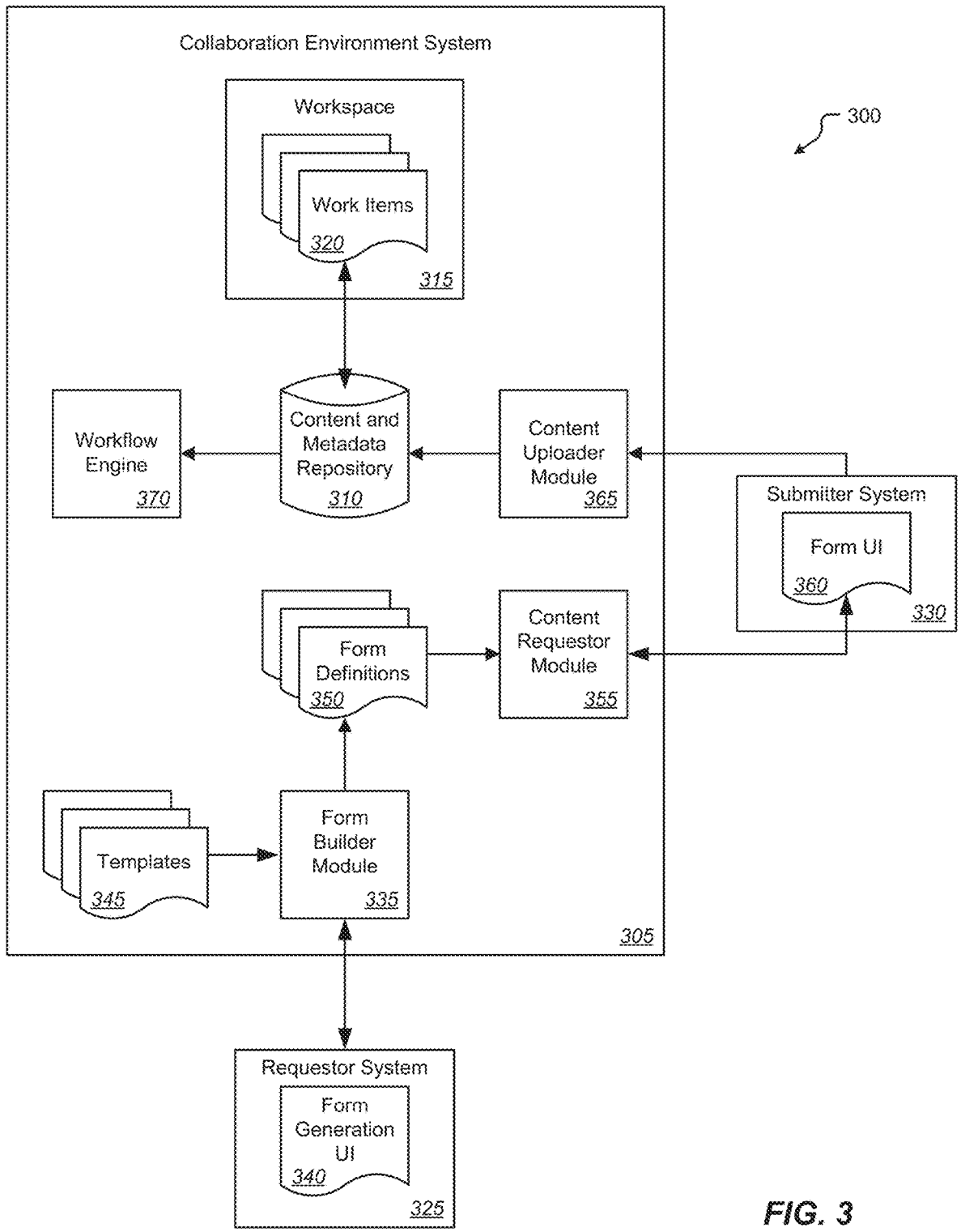
FIG. 3 is a block diagram illustrating elements of an exemplary cloud-based collaboration environment according to one embodiment of the present disclosure.

FIG. 3 is a block diagram illustrating elements of an exemplary cloud-based collaboration environment according to one embodiment of the present disclosure. As illustrated in this example, the cloud-based collaboration environment 300 can include a collaboration environment system 305 such as any one or more of the servers described above. Generally speaking, the collaboration environment system 305 can maintain a content and metadata repository 310. This repository 310 can store files and other content as well as metadata associated with that content as will be described further below. The collaboration environment system 305 can also provide a virtual workspace 315 in which content from the content and metadata repository can be made available as one or more work items 320. Any number of online users (not shown here) can then, with proper permissions, access the work items 320, e.g., create, read, and edit.

Also as shown here, the cloud-based collaboration environment 300 can include a requestor system 325 and a submitter system 330. Generally speaking, the requestor system 325 can be associated with a requestor, i.e., a user of the cloud-based collaboration environment 300 who will make a request for content to be added to the workspace 315 and can comprise any of the computing devices described above. Similarly, the submitter system 325 can be associated with a submitter, i.e., a user of the cloud-based collaboration environment 300 who will provide the requested content to be added to the workspace 315 and can also comprise any of the computing devices described above. Each of the requestor system 325 and the submitter system 330 can be communicatively coupled with the collaboration environment system by one or more communications network (not shown here) as described above.

According to one embodiment, the collaboration environment system 305 can be adapted to allow a user of the requestor system 325, i.e., the requestor, to initiate a request for content of the workspace 315 to be provided by another user, i.e., the submitter, through the submitter system 330. Accordingly, the collaboration environment system 305 can execute a form builder module 335. The form builder module 335 can present, through the requestor system 325, a form generation user interface 340, such as a web page or other graphical or non-graphical interface through which a request for content can be initiated. Generally speaking, the form generation user interface 340 allows the requestor to define a form that will be presented to the submitter to request the content and associated metadata for that content. To do so, the requestor can specify one or more content items to be submitted and can select metadata to be provided by the submitter with the content item.

In some cases, the form builder module 335 can generate the content request identifying the one or more content items and metadata for the one or more content items requested from the submitter by copying a previously generated form definition 350 for a previously generated content request. For example, a user can select the previously generated form definition 350 through the form generation UI 340 to be used as-is for another request or to me modified, again through the form generation UI 340, for the new request. Additionally, or alternatively, the form builder module 335 can generate the content request identifying the one or more content items and metadata for the one or more content items requested from the submitter by copying a template form definition 345 for content requests, e.g., for particular types of requests, for requests by a certain user or in a certain workspace, etc. Again, for example, a user can select the template 345 through the form generation UI 340 and modify the template 345 through the form generation UI 340 to generate the new request.

Stated another way, requesting and obtaining one or more content items for a workspace of a collaboration environment can begin with the form builder module 335 generating and presenting a form generation user interface 340. Through the form generation user interface 340 the requestor can define a content request by identifying the one or more content items and metadata for the content item. That is, the requestor can select or indicate which, if any, metadata from a set of available metadata for the one or more content items will be requested and the values for those selected or indicated metadata tags will be provided by the submitter along with the one or more content items when responding to the request. For example, the selected metadata can be manually selected by the requestor from a list of available metadata tags by manipulating the user interface and/or automatically based on any of a number of factors associated with the requestor, the workspace, the content requested, etc. Additionally, or alternatively, the requestor may define a number of criteria for the metadata such as a type for the requested metadata and/or how the metadata value will be provided by the submitter, e.g., text entered through a textbox, a selection of options from a dropdown, etc. In some cases, the requestor may request more than one content item and each content item may be associated with a different set of requested metadata. The requestor can define for each piece of metadata if it is required to be submitted or optional. Accordingly, selection of one or more of the available metadata tags can also be received by the form builder module 335 from the requestor, through the form generation user interface 340 for each content item requested.

The form builder module 335 can also receive, from the requestor, through the form generation user interface 340, an indication of one or more security settings for the content request. These security settings or permissions can be associated with the content item as well as the generated request for the content item. The security settings or permissions can comprise any of a variety of settings and/or permissions and can include, but are not limited to, an indication of whether the content item is subject to password protection, an indication of expiration time or duration for the generated content request, one or more request sharing settings, e.g., whether the generated content request can be shared global, within a certain group such as employees of a company, or with certain individuals, etc. According to one embodiment, the security settings can include at least one setting indicating whether the content item(s) and metadata requested can be submitted anonymously, i.e., by a user that is unknown to the collaboration environment system 305. Such a setting can be defined or selected by the user, for example, through a checkbox or similar control in the form generation UI 340. In the case where the setting indicates that the content item(s) and metadata requested cannot be submitted anonymously, the submitter can be required to first logon to the collaboration environment system 305 before submitting the content items(s) and metadata as will be described further below.

Based on the content and metadata selections and/or definitions received through the form generation user interface 340, the form builder module 335 can save a form definition 350. For example, the form definition can comprise a JavaScript Object Notation (JSON) blob. According to one embodiment, the form builder module 335 can generating the content request by generating a link, i.e., a Universal Resource Locator (URL), to the saved form definition 350.

The collaboration environment system 305 can also execute a content requestor module 355. Generally speaking, the content requestor module 355 can retrieve the form definition 350 or the saved link to the form definition 350, and provide this definition or link to the submitter system 330. The form definition 350 or link to the form definition 350 can be provided to the submitter, for example, through an email from the requestor to the submitter and containing the link to the form definition 350. In other cases, the link to the form definition 350 can be provided through a webpage or other available access medium. In this way, the request can be made not only to users of the collaboration environment system 305 or those users known to the collaboration environment system 305 but, it can also be made to anonymous users, i.e., those who are not users of the collaboration environment system 305 or who are not otherwise known to the collaboration environment system 305. However, and as noted above, security settings of the content request may indicate that anonymous submission may not be permitted. In such cases, the content requestor module 355 may first initiate a login or other authorization process between the collaboration environment system 305 and the submitter system 330.

Once obtained, the submitter system 330 can then use the form definition 350 to dynamically generate a form user interface 350, e.g., through a browser or other application executing on the submitter system 330. This form user interface 360, based on the form definition 350 can present instructions and fields for the submitter to provide the request content and the requested metadata for that content.

Stated another way, the generated content request can be provided by the cloud-based collaboration environment system 305, through the content requestor module 355 to a computing device associated with the submitter, i.e., the submitter system 330. In some cases, providing the generated content request to the submitter system 330 can comprise receiving, from the submitter system 330, a request to submit the requested content item and providing the generated form definition 350 or link to the generated form definition 350 to the submitter system 330 in response to the request to submit the requested content item. The submitter system 330 can then use the form definition 350, e.g., a JSON blob, to dynamically render a form user interface 360 through which the submitter can provide the content item for upload and define the values for the requested metadata.

In response to the provided request, and based on the submitters interactions with the form user interface 360, the content item and the requested metadata for the one or more content items can be obtained by, i.e., uploaded to, the cloud-based collaboration environment system 305 from the submitter system 330 by a content uploader module 365 executed by the collaboration environment system 305. In some cases, the received content item and values for the metadata for the one or more content items can then be validated, e.g., if the value should be numeric instead of alpha-numeric or if the value should conform to a specific format like date format. In response to determining the received content item and values for the metadata for the one or more content items are not valid, a request for resubmission may be made by the content uploader module 365 to the submitter system 330. In response to determining the received content item and values for the metadata for the one or more content items are valid, the content item and values for the metadata for the one or more content items can be saved in the content and metadata repository 310 and can be made available as a work item 320 in the workspace 315 of the collaboration environment.

In some cases, other processes may also be performed. For example, the content uploader module 365 can provide, in response to obtaining the content item and the requested metadata for the content item, a notification of the obtained content item and metadata for the one or more content items to the requestor. In some cases, the collaboration environment system 305 may execute a workflow engine370. I such cases, the content uploader module 365 can initiate a workflow to be executed by the workflow engine 370 based on at least one of the obtained content item and/or the metadata for the obtained content item. Generally speaking, the initiated workflow can comprise any of a wide variety of processing to be applied to the content item(s) and/or the metadata of the content item(s). For example, the processes can include, but are not limited to, adding a watermark to the content item(s), copying the content item(s), locking the content item(s), moving the content item(s), applying a classification to the content item(s), applying metadata to the content item(s), assigning one or more tasks to the content item(s), etc. Regardless of the processes performed, when more than one content item is submitted per content request, the workflow processes can be applied to the content items as a package, i.e., rather than on a file-by-file basis.

Figure 4:
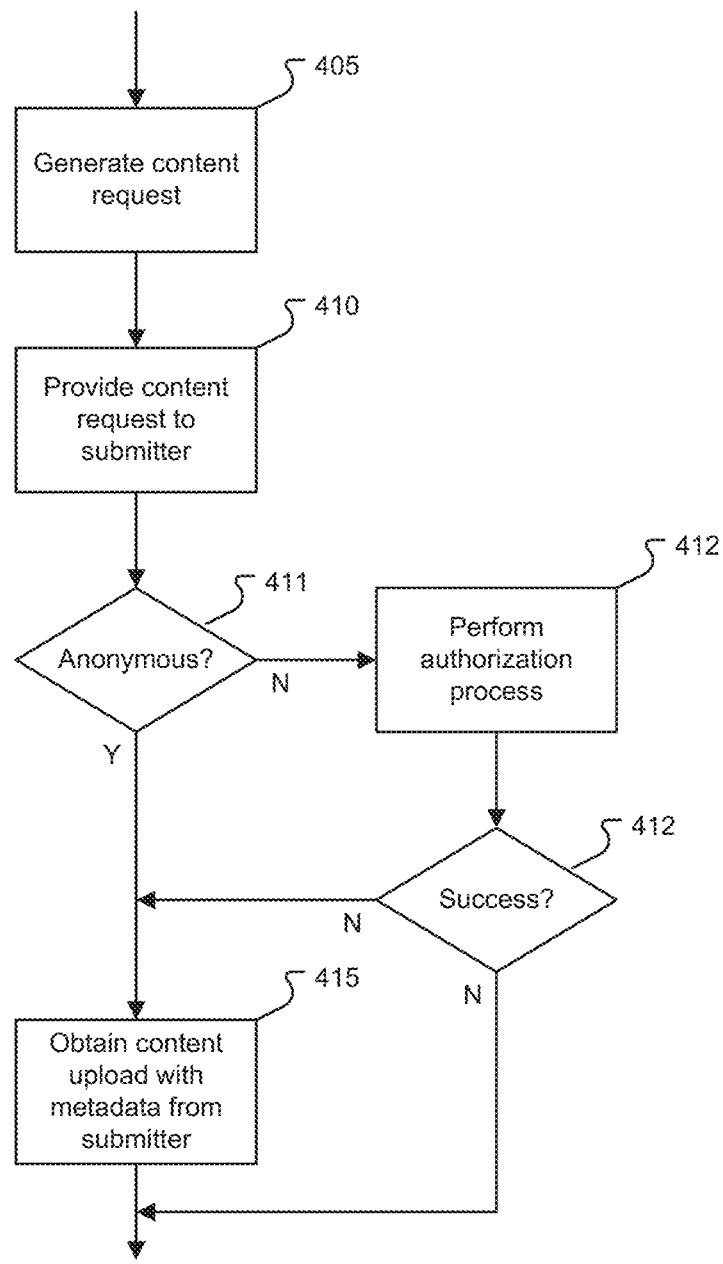
FIG. 4 is a flowchart illustrating an exemplary process for requesting and obtaining content and metadata for a workspace of a collaboration environment according to one embodiment of the present disclosure.

FIG. 4 is a flowchart illustrating an exemplary process for requesting and obtaining content and metadata for a workspace of a collaboration environment according to one embodiment of the present disclosure. As illustrated in this example, requesting and obtaining a content item for a workspace of a collaboration environment can begin with generating 405, by a cloud-based collaboration environment system, a content request identifying the content item and metadata for the content item. The requested metadata for the one or more content items can be defined by a requestor of the content item and the content item and the metadata for the one or more content items can be requested from a submitter. That is, the requestor can select or indicate which metadata, if any, from a set of available metadata for the one or more content items will be requested and the values for those selected or indicated metadata tags will be provided by the submitter along with the content item when responding to the request. In some cases, the content item can comprise a plurality of content items and the requested metadata for the one or more content items defined by the requestor can be different between content items. Additional details of an exemplary process for generating 405 the content request will be described below with reference to FIG. 5.

As noted above, generating 405 the content request identifying the one or more content items and metadata for the one or more content items requested from the submitter can comprise copying a previously generated form defining a previous content request. Additionally, or alternatively, generating 405 the content request identifying the one or more content items and metadata for the one or more content items requested from the submitter can comprise copying a form defining a template content request. Also as noted above, at least one security settings for the content request may indicate whether the content item can be submitted anonymously. In such cases, generating 4-5 the content request can comprise defining this property as described above.

The generated content request can be provided 410 by the cloud-based collaboration environment system to a computing device associated with the submitter. The submitter may be a user of the workspace of the collaboration environment, for example. However, in other cases, the submitter may not be a user of the workspace and may be unknown to the collaboration environment system. As described herein, the request can be made through a form to be presented or rendered on the computing device of the submitter. According to one embodiment, this can be accomplished by providing a form definition or a link to a location where a form definition is saved. The computing device of the submitter can then use the form definition to dynamically render a form user interface through which the submitter can provide the content item for upload and define the values for the requested metadata.

As noted above, at least one security settings for the content request may indicate whether the content item can be submitted anonymously. Accordingly, a determination 411 can be made as to whether, the property indicating the one or more content items may be submitted anonymously. In response to determining 411 that the property indicates the one or more content items may be submitted anonymously, the one or more content items and the requested metadata for the one or more content items can be obtained 415 by the cloud-based collaboration environment system from the computing device associated with the submitter in response to the provided request while maintaining the anonymity of the submitter. In response to determining 411 that the property indicates the one or more content items may not be submitted anonymously, a login or other authorization process with the computing device of the submitter can be initiated and performed 412 by the cloud-based collaboration environment system. A determination 412 can then be made by the cloud-based collaboration environment system as to whether the login or other authorization process has been completed successfully. In response to determining 412 the login or other authorization process has completed successfully, the one or more content items and the requested metadata for the one or more content items can be obtained 415 by the cloud-based collaboration environment system from the computing device associated with the submitter in response to the provided request. Once obtained 415, the content item and associated metadata can be made available in the workspace of the collaboration environment. Additional details of an exemplary process for obtaining 415 the content item and metadata for the one or more content items will be described below with reference to FIG. 6.

Figure 5:
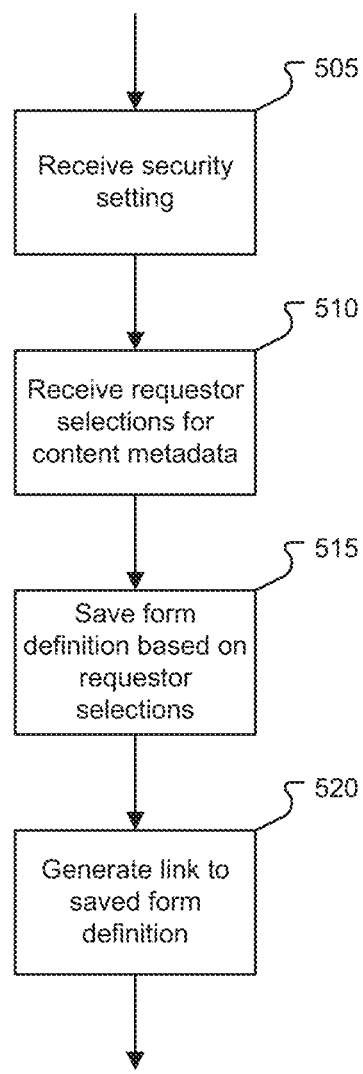
FIG. 5 is a flowchart illustrating an exemplary process for generating a content request according to one embodiment of the present disclosure.

FIG. 5 is a flowchart illustrating an exemplary process for generating a content request according to one embodiment of the present disclosure. As illustrated in this example, generating the content request can comprise receiving 505, from the requestor of the content item, an indication of one or more security settings for the content request. These security settings or permissions can be associated with the content item as well as the generated request for the content item. The security settings or permissions can comprise any of a variety of settings and/or permissions and can include, but are not limited to, an indication of whether the content item is subject to password protection, an indication of expiration time or duration for the generated content request form definition or link to the content request for definition, one or more request sharing settings, e.g., whether the generated content request form definition or link to the content request for definition can be shared global, within a certain group such as employees of a company, or with certain individuals, whether the content item(s) can be submitted anonymously or a login or other authorization of the submitter to the collaboration environment system will be required, etc.

Selection of one or more of the available metadata tags can also be received 510 from the requestor. The value for the selected metadata tag will be requested from and provided by the submitter with the requested content item. That is, the requestor can select or define, e.g., through a graphical or other user interface used to generate the request, one or more metadata tags associated with the requested content item. For example, the selected metadata can be manually selected by the requestor from a list of available metadata tags by manipulating the user interface and/or automatically based on any of a number of factors associated with the requestor, the workspace, the content requested, etc. Additionally, or alternatively, the requestor may define a number of criteria for the metadata such as a type for the requested metadata and/or how the metadata value will be provided by the submitter, e.g., text entered through a textbox, a selection of options from a dropdown, etc. Also, as noted above, the requestor may request more than one content item and each content item may be associated with a different set of requested metadata. Accordingly, selection of one or more of the available metadata tags can also be received 510 from the requestor for each content item requested.

In some cases, receiving 510 selection of one or more of the available metadata tags and generating the content request identifying the one or more content items and metadata for the one or more content items requested from the submitter by copying a previously generated form definition for a previously generated content request. For example, a user can select the previously generated form definition through the form generation UI to be used as-is for another request or to me modified, again through the form generation UI, for the new request. Additionally, or alternatively, receiving 510 selection of one or more of the available metadata tags and generating the content request identifying the one or more content items and metadata for the one or more content items requested from the submitter by copying a template form definition for content requests, e.g., for particular types of requests, for requests by a certain user or in a certain workspace, etc. Again, for example, a user can select the template through the form generation UI and modify the template through the form generation UI to generate the new request.

A form definition for the content request can be saved 515 based on the requested content item and/or one or more available metadata tags. For example, saving the form definition for the content request can comprise saving a JavaScript Object Notation (JSON) blob. Generating the content request can further comprise generating 520 a link to the saved form definition and providing the generated content request to the computing device associated with the submitter can comprise providing the generated link to the saved form definition. In such cases, the computing device associated with the submitter can dynamically generate a form user interface based on the JSON blob in response to receiving the generated link. As noted above, property for the content request can indicate whether the content item(s) can be submitted anonymously or whether the submitter is required to login to the collaboration environment system prior to submitting the content item(s) and metadata. Such a setting may be indicated in either the link or the form definition, e.g., by providing a redirection to initiate a login or other authorization process.

Figure 6:
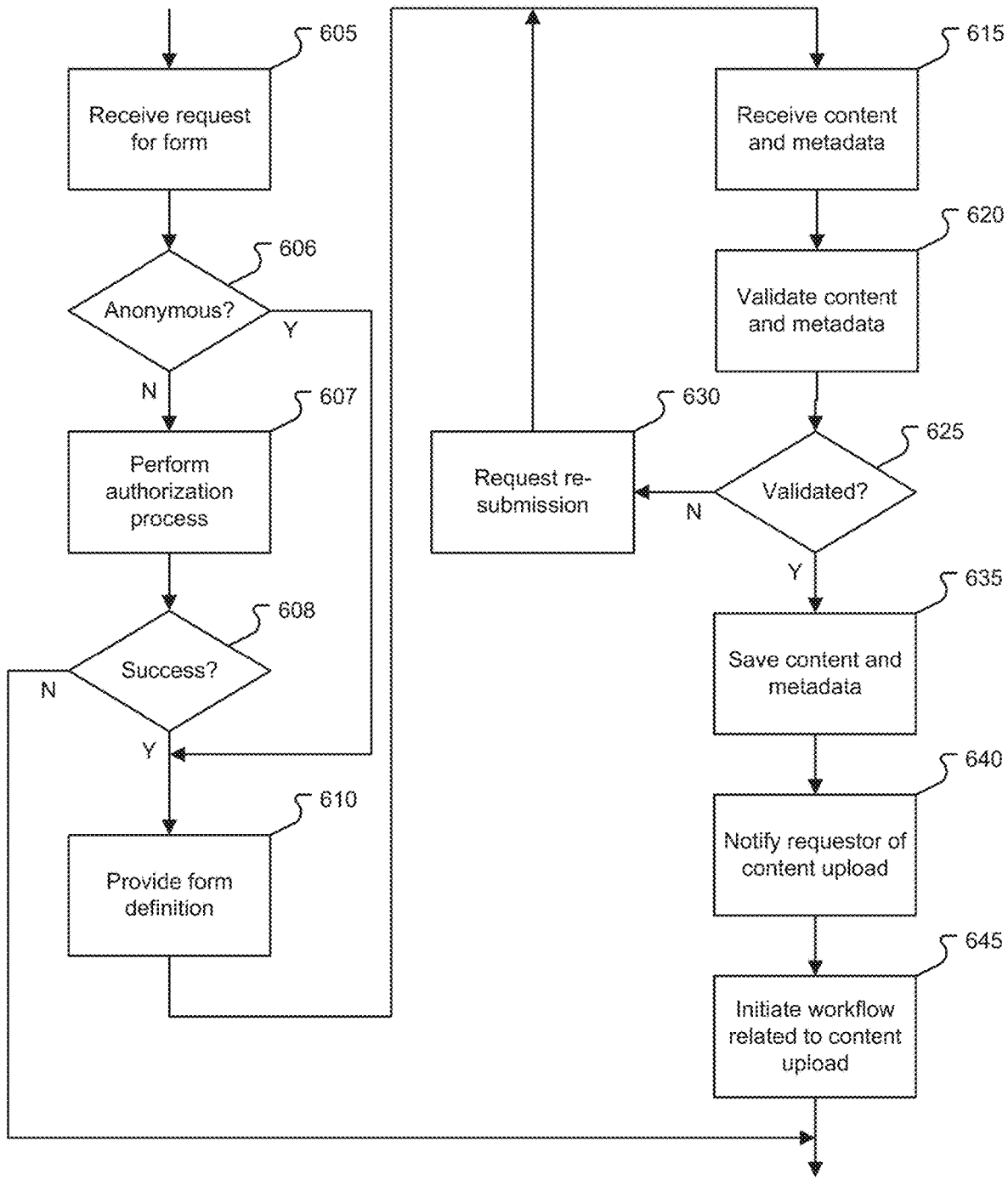
FIG. 6 is a flowchart illustrating an exemplary process for obtaining content for a workspace of a collaboration environment according to one embodiment of the present disclosure.

FIG. 6 is a flowchart illustrating an exemplary process for obtaining content for a workspace of a collaboration environment according to one embodiment of the present disclosure. As illustrated in this example, providing the generated content request to the computing device associated with the submitter can comprise receiving 605, from the computing device associated with the submitter, a request to submit the requested content item. A determination 606 can be made, for example based on a property of the content request, as to whether the content items may be submitted anonymously. In response to determining 606 that the property indicates the one or more content items may be submitted anonymously, the form definition can be provided 610 to the computing device associated with the submitter in response to the request to submit the requested content item. In response to determining 606 that the property indicates the one or more content items may not be submitted anonymously, a login or other authorization process with the computing device of the submitter can be initiated and performed 607 by the cloud-based collaboration environment system. A determination 608 can then be made by the cloud-based collaboration environment system as to whether the login or other authorization process has been completed successfully. In response to determining 608 the login or other authorization process has completed successfully, the generated form definition or link to the generated form definition can be provided 610 to the computing device associated with the submitter in response to the request to submit the requested content item.

Obtaining the content item and the requested metadata for the one or more content items from the computing device associated with the submitter can then further comprise receiving 615, from the computing device associated with the submitter, the content item and values for the requested metadata for the content item. The received content item and values for the metadata for the one or more content items can then be validated, e.g., based on security settings defined for the content item etc. A determination 625 can be made as to whether the content item and the submitted metadata is valid. In response to determining 625 the received content item and values for the metadata for the one or more content items are not valid, a request for resubmission may be made 630. In response to determining 625 the received content item and values for the metadata for the one or more content items are valid, the content item and values for the metadata for the one or more content items can be saved 635 in a repository of work items available in the workspace of the collaboration environment.

Once the content item and submitted metadata are saved 635, they can be made available in the workspace of the collaboration environment. In some cases, other processes may also be performed. For example, the cloud-based collaboration environment system can provide 640, in response to obtaining the content item and the requested metadata for the content item, a notification of the obtained content item can be sent to the requestor. Additionally, or alternatively, the cloud-based collaboration environment system can initiate 645 a workflow based on receiving the obtained content item or the metadata for the obtained content item. Generally speaking, the initiated workflow can comprise any of a wide variety of processing to be applied to the content item(s) and/or the metadata of the content item(s). For example, the processes can include, but are not limited to, adding a watermark to the content item(s), copying the content item (s), locking the content item(s), moving the content item(s), applying a classification to the content item(s), applying metadata to the content item(s), assigning one or more tasks to the content item(s), etc. Regardless of the processes performed, when more than one content item is submitted per content request, the workflow processes can be applied to the content items as a package, i.e., rather than on a file-by-file basis.

Figure 7:
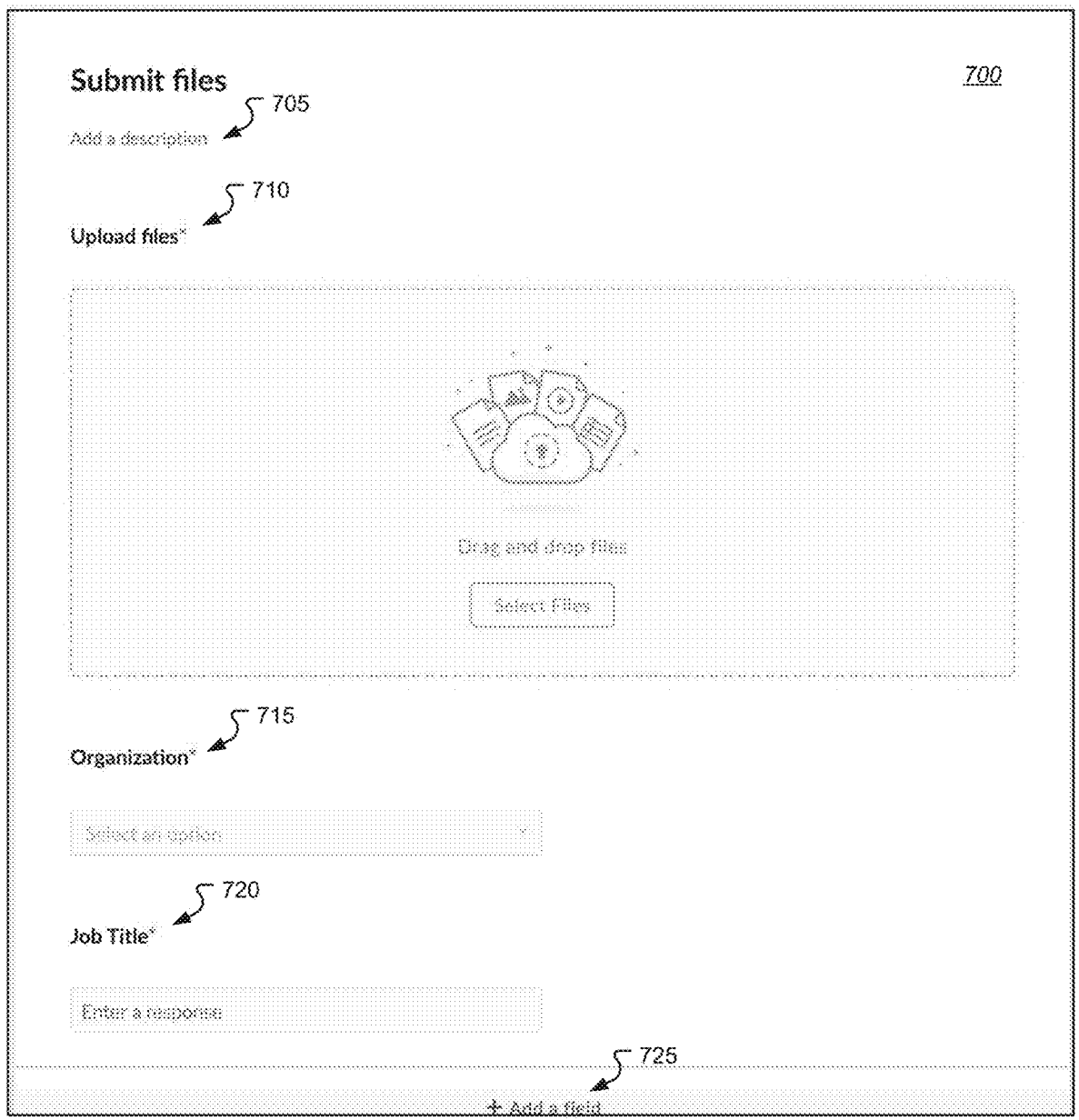
FIG. 7 is a screenshot illustrating an exemplary user interface for a content request form generation user interface according to one embodiment of the present disclosure.

FIG. 7 is a screenshot illustrating an exemplary user interface for a content request form generation user interface according to one embodiment of the present disclosure. As illustrated in this example, the content request form generation user interface 700 can comprise a textbox or field 705 in which a user can provide a description of the content requested and a representation of an upload area 710 for a requested content item. The content request form generation user interface 700 can also include one or more indications of metadata 715 and 720 being requested from the submitter of the content item. Additionally, a link 725, button, or other control for adding additional fields to the form, e.g., another content item and/or metadata, may be included.

Figure 8:
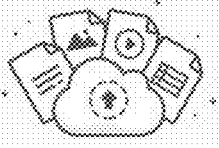
FIG. 8 is a screenshot illustrating an exemplary content submission form user interface according to one embodiment of the present disclosure.

FIG. 8 is a screenshot illustrating an exemplary content submission form user interface according to one embodiment of the present disclosure. More specifically, this example illustrates the content submission form user interface 800 as it can be rendered on the submitters computing device. As illustrated here, the content submission form user interface 800 can include an upload area through which the user may select or drag and drop content items to be uploaded. The content submission form user interface 800 can also include one or more of a combobox 810, a textbox 815, and/or other elements through which the user can select or enter values for the requested metadata of the content item. A button 820, link, or other element can be provided which the user can click or otherwise select to submit the content item and metadata.

Figure 9:
FIG. 9 is a screenshot illustrating an exemplary completed content submission form user interface according to one embodiment of the present disclosure.

FIG. 9 is a screenshot illustrating an exemplary completed content submission form user interface according to one embodiment of the present disclosure. In this example, the content submission form user interface 800 has been updated after the submitter has selected the content item 905 and defined values 910 and 915 for the requested metadata.

Figure 10:
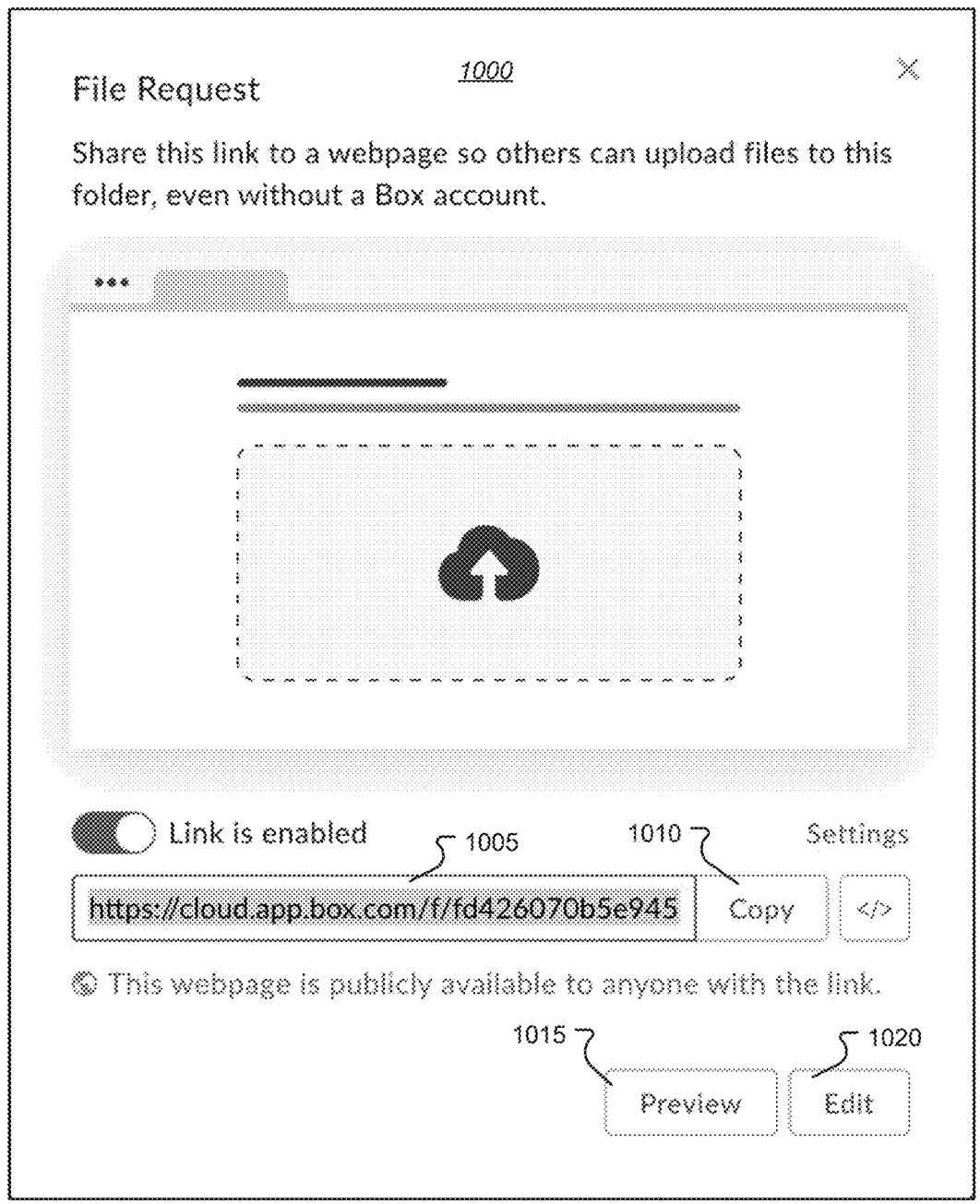
FIG. 10 is a screenshot illustrating an exemplary file request initiation user interface according to one embodiment of the present disclosure.

FIG. 10 is a screenshot illustrating an exemplary file request initiation user interface according to one embodiment of the present disclosure. As illustrated in this example, the file request initiation user interface 1000 can include a textbox 1005 in which the generated link to the form definition can be presented. A number of buttons or other elements may be presented through which the user can access various functions. For example, a copy button 1010 can be clicked or otherwise selected to allow the link to the form definition to be copied, i.e., to be pasted elsewhere, a preview button 1015 can be clicked or otherwise selected to view a preview of the form, and an edit button 1020 can be clicked or otherwise selected to edit the content request form.

It should be understood that the user interfaces illustrated in FIGS. 7-10 and described above are provided by way of example for illustrative purposes only and are intended to limit the scope of the present disclosure. Rather, the interfaces can vary significantly in different implementations without departing from the scope of the present disclosure. For example, the interfaces may have more, fewer, and/or different elements and other content, different formats, etc. Such variations are considered to be within the scope of the present disclosure.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for requesting and obtaining one or more content items for a workspace of a collaboration environment, the method comprising:
   generating, by a server of a cloud-based collaboration environment, a content request identifying the one or more content items and metadata for the one or more content items requested from a submitter, wherein the one or more content items and metadata for the one or more content items are not available on the cloud-based collaboration environment when the content request is generated, and wherein the one or more content items and metadata for the one or more content items are requested to be uploaded to the server of the cloud-based collaboration environment from a client computing device associated with the submitter;
   providing, by the server of the cloud-based collaboration environment, the generated content request to the client computing device associated with the submitter;
   determining, by the server of the cloud-based collaboration environment, whether the one or more content items may be submitted anonymously; and
   in response to determining the one or more content items may be submitted anonymously, obtaining, by the server of the cloud-based collaboration environment, the one or more content items and the requested metadata for the one or more content items from the client computing device associated with the submitter in response to the provided request while maintaining the anonymity of the submitter.

2. The method of claim 1, further comprising:
   in response to determining the one or more content items may not be submitted anonymously, initiating, by the server of the cloud-based collaboration environment, an authorization process with the client computing device of the submitter;
   determining, by the server of the cloud-based collaboration environment, whether the authorization process has been completed successfully; and
   in response to determining the authorization process has completed successfully, obtaining, by the server of the cloud-based collaboration environment, the one or more content items and the requested metadata for the one or more content items from the client computing device associated with the submitter in response to the provided request.

3. The method of claim 2, wherein generating the content request further comprises generating a link to a saved form definition, wherein, in response to determining the one or more content items may not be submitted anonymously, the link initiates the authorization process, and wherein providing the generated content request to the client computing device associated with the submitter comprises providing the generated link to the saved form definition.

4. The method of claim 1, wherein generating the content request identifying the one or more content items and metadata for the one or more content items requested from the submitter comprises copying a form defining a previous content request.

5. The method of claim 1, wherein generating the content request identifying the one or more content items and metadata for the one or more content items requested from the submitter comprises copying a form defining a template content request.

6. The method of claim 1, further comprising initiating, by the server of the cloud-based collaboration environment, a workflow based on the obtained one or more content items or the obtained metadata for the obtained content item.

7. The method of claim 6, wherein the obtained one or more content items comprise a plurality of content items and wherein the workflow is applied to the plurality of content items as a whole package.

8. A cloud-based collaboration environment server comprising:
   a processor; and
   a memory coupled with and readable by the processor and storing therein a set of instructions which, when executed by the processor, causes the processor to request and obtain one or more content items for a collaboration environment by:
  generating a content request identifying the one or more content items and metadata for the one or more content items requested from a submitter, wherein the one or more content items and metadata for the one or more content items are not available on the cloud-based collaboration environment server when the content request is generated, and wherein the one or more content items and metadata for the one or more content items are requested to be uploaded to the cloud-based collaboration environment server from a client computing device associated with the submitter;
  providing the generated content request to the client computing device associated with the submitter;
  determining whether the one or more content items may be submitted anonymously; and
  in response to determining the one or more content items may be submitted anonymously, obtaining the one or more content items and the requested metadata for the one or more content items from the client computing device associated with the submitter in response to the provided request while maintaining the anonymity of the submitter.

9. The cloud-based collaboration environment server of claim 8, wherein the instructions further cause the processor to:
  in response to determining the one or more content items may not be submitted anonymously, initiate an authorization process with the client computing device of the submitter;
  determine whether the authorization process has been completed successfully; and
  in response to determining the authorization process has completed successfully, obtain the one or more content items and the requested metadata for the one or more content items from the client computing device associated with the submitter in response to the provided request.

10. The cloud-based collaboration environment server of claim 9, wherein generating the content request further comprises generating a link to a saved form definition, wherein, in response to determining the one or more content items may not be submitted anonymously, the link initiates the authorization process, and wherein providing the generated content request to the client computing device associated with the submitter comprises providing the generated link to the saved form definition.

11. The cloud-based collaboration environment server of claim 8, wherein generating the content request identifying the one or more content items and metadata for the one or more content items requested from the submitter comprises copying a form defining a previous content request.

12. The cloud-based collaboration environment server of claim 8, wherein generating the content request identifying the one or more content items and metadata for the one or more content items requested from the submitter comprises copying a form defining a template content request.

13. The cloud-based collaboration environment server of claim 8, wherein the instructions further cause the processor to initiate a workflow based on the obtained one or more content items or the obtained metadata for the obtained content item.

14. The cloud-based collaboration environment server of claim 13, wherein the obtained one or more content items comprise a plurality of content items and wherein the workflow is applied to the plurality of content items as a whole package.

15. A non-transitory, computer-readable medium comprising a set of instructions stored therein which, when executed by a processor, causes the processor to request and obtain content for a collaboration environment by:
  generating, by a server of the cloud-based collaboration environment, a content request identifying the one or more content items and metadata for the one or more content items requested from a submitter, wherein the one or more content items and metadata for the one or more content items are not available on the cloud-based collaboration environment when the content request is generated, and wherein the one or more content items and metadata for the one or more content items are requested to be uploaded to the server of the cloud-based collaboration environment from a client computing device associated with the submitter;
  providing, by the server of the cloud-based collaboration environment, the generated content request to the client computing device associated with the submitter;
  determining, by the server of the cloud-based collaboration environment, whether the one or more content items may be submitted anonymously; and
  in response to determining the one or more content items may be submitted anonymously, obtaining, by the server of the cloud-based collaboration environment, the one or more content items and the requested metadata for the one or more content items from the client computing device associated with the submitter in response to the provided request while maintaining the anonymity of the submitter.

16. The non-transitory, computer-readable medium of claim 15, wherein the instructions further cause the processor to:
  in response to determining the one or more content items may not be submitted anonymously, initiate, by the server of the cloud-based collaboration environment, an authorization process with the client computing device of the submitter;
  determine, by the server of the cloud-based collaboration environment, whether the authorization process has been completed successfully; and
  in response to determining the authorization process has completed successfully, obtain, by the server of the cloud-based collaboration environment, the one or more content items and the requested metadata for the one or more content items from the client computing device associated with the submitter in response to the provided request.

17. The non-transitory, computer-readable medium of claim 16, wherein generating the content request further comprises generating a link to a saved form definition, wherein, in response to determining the one or more content items may not be submitted anonymously, the link initiates the authorization process, and wherein providing the generated content request to the client computing device associated with the submitter comprises providing the generated link to the saved form definition.

18. The non-transitory, computer-readable medium of claim 15, wherein generating the content request identifying the one or more content items and metadata for the one or more content items requested from the submitter comprises copying a form defining a previous content request.

19. The non-transitory, computer-readable medium of claim 15, wherein generating the content request identifying the one or more content items and metadata for the one or more content items requested from the submitter comprises copying a form defining a template content request.

20. The non-transitory, computer-readable medium of claim 15, wherein the instructions further cause the processor to initiate, by the server of the cloud-based collaboration environment, a workflow based on the obtained one or more content items or the obtained metadata for the obtained content item, wherein the obtained one or more content items comprise a plurality of content items, and wherein the workflow is applied to the plurality of content items as a whole package.

* * * * *

UNITED STATES PATENT AND TRADEMARK OFFICE
CERTIFICATE OF CORRECTION

| | |
|---|---|
| PATENT NO. | : 12,136,065 B2 |
| APPLICATION NO. | : 17/162282 |
| DATED | : November 5, 2024 |
| INVENTOR(S) | : Virender Gupta and Ravneet Uberoi |

It is certified that error appears in the above-identified patent and that said Letters Patent is hereby corrected as shown below:

In the Specification

At Column 1, Line 9, delete "16/7944,529" and insert therein --16/944,529--

Signed and Sealed this
Third Day of December, 2024

Katherine Kelly Vidal
*Director of the United States Patent and Trademark Office*